July 7, 1964

L. S. VICKERY 3,139,939

POWER-DRIVEN FIELD CULTIVATOR WITH
SOIL-SIFTING ATTACHMENT

Filed March 15, 1962

INVENTOR
L. S. VICKERY

BY Barnes & Reed
attys.

July 7, 1964  L. S. VICKERY  3,139,939
POWER-DRIVEN FIELD CULTIVATOR WITH
SOIL-SIFTING ATTACHMENT
Filed March 15, 1962  2 Sheets-Sheet 2

INVENTOR
L. S. VICKERY

United States Patent Office 3,139,939
Patented July 7, 1964

3,139,939
POWER-DRIVEN FIELD CULTIVATOR WITH SOIL-SIFTING ATTACHMENT
Leslie Stanton Vickery, 2707 Violet St., North Vancouver, British Columbia, Canada, assignor of one-half to Floyd Graves, Vancouver, British Columbia, Canada
Filed Mar. 15, 1962, Ser. No. 179,886
4 Claims. (Cl. 171—63)

This invention relates to a power-driven field cultivator for use in preparing ground for planting, and for its principal object aims to provide a machine for this purpose which will both cultivate and sift the earth, returning to the field the sifted soil while trapping rocks and rock-like dirt lumps as well as other foreign matter such as roots, coarse grasses and the like present in the soil.

A further and important object of the invention is to provide a soil-sifting machine made in the form of an attachment for use in conjunction with existing engine-driven tillers, particularly those of the type commonly termed "walking cultivators" where the operator steers and otherwise controls the machine while walking behind the same.

The invention has the further and important object of providing an attachment for existing tiller machines embodying means by which power required for the operation of the attachment is derived from the engine of the tiller, and which permits the attachment, including the power train, to be applied to and removed from the tiller with ease and expedition and requires little or no reworking of the tiller in order to adapt the one to the other.

As a yet further important object the invention aims to provide a machine for the described purpose engineered so that the engine may be made to drive either the tiller mechanism or the sifting mechanism one independently of the other.

Still further objects are to provide a machine which requires minimum horsepower for its operation, which is of compact size and light in weight, which will withstand long and rough usage with little liability of parts breakage, and which can be inexpensively produced.

These and other objects and advantages in view will appear and be understood in the course of the following description and claims, the invention consisting in the novel construction and in the adaptation and combination of parts hereinafter described and claimed.

Figure 1:
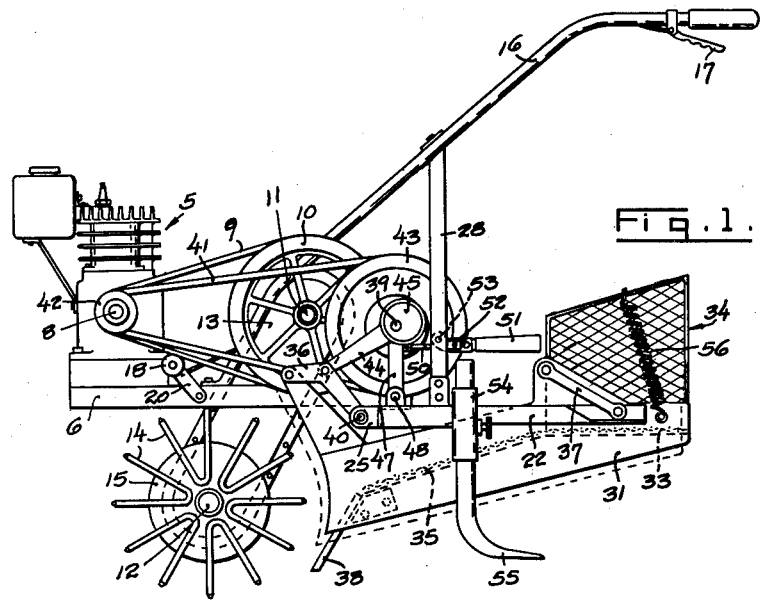
FIGURE 1 is a side elevational view illustrating a soil-sifting machine constructed to embody the preferred teachings of the present invention and shown attached to an existing popular type of walking cultivator.
Figure 2:
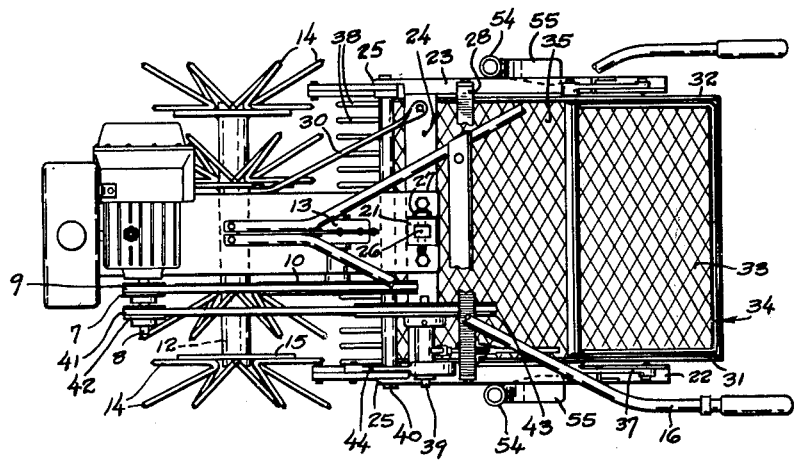
FIG. 2 is a top plan view thereof with some of the parts shown fragmentarily.
Figure 3:
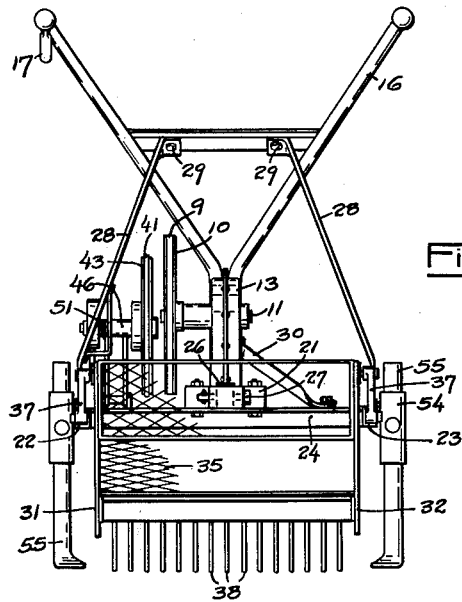
FIG. 3 is a rear elevational view with a rock-catching basket removed.
Figure 4:
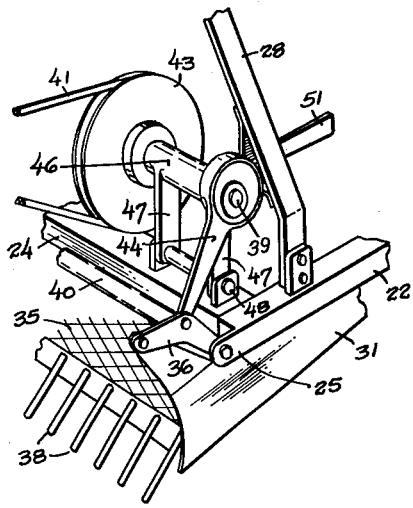
FIG. 4 is a fragmentary perspective view.

The screening attachment of the present invention is shown applied to a tiller of the type illustrated and described in U.S. Pat. No. 2,614,474, issued Oct. 21, 1952 to Clayton B. Merry. In said drawings an internal combustion engine 5 surmounts a frame 6 at the front end of the latter. A drive pulley 7 occupies a position at one side of the engine, being driven by the engine's drive shaft 8 for rotation about a transverse horizontal axis, and an endless belt 9 provides a reduction drive from such drive pulley to a driven pulley wheel 10 lying to the rear thereof. The pulley wheel is mounted on a shaft 11 journaled in the upper part of a transmission case 13 which is rigid with the frame. Within this case chains (not shown) transfer the drive downwardly to shaft 12 journaled in the lower part of the case. Shaft 12 has its ends protruding laterally from the two sides of the case, and ground-tilling wheels are mounted on these exposed ends. In the tiller which I have elected to illustrate the tilling wheels give traction to the tiller as well as performing a ground-tilling function. In performing this tilling function tines 14 extending radially from flanged hubs 15 of the wheels act to break up the ground and move the loosened material in a rearward direction.

Handles 16 for the tiller are bolted to the frame and extend upwardly and rearwardly therefrom. Levers, as 17, are provided upon the handles and act through cables to control the operation of the engine and the transmission of power to the driven pulley wheel 10. The latter such control, as here shown, comprises a roller 18 carried upon the free end of a pivoted link 20 and brought to bear against the drive belt 9 for tensioning the same. Slack, when present in the belt, permits the drive pulley 7 to run free in the belt's forward bight.

At its rear end on the longitudinal median line the frame is bossed, as at 21, and has a vertical through-opening in such bossed portion. In the normal use of the tiller the socket which this opening provides accommodates a brake tooth. When the attachment of the present invention is applied to the tiller such brake tooth is removed and the socket employed as one connection between the frame of the tiller and a stationary frame for the attachment.

The latter said frame provides laterally spaced longitudinal principals 22–23 connected by an integral cross member 24. Other than for ears 25 prolonged forwardly, the cross member lies at the extreme front end of the side principals. A prong 26 rising from the cross member fits in said socket of the tiller frame and is secured therein by a cross-pin 27. Complementing said prong in securing the attachment to the tiller are hanger arms 28, bolted as at 29 to a cross-member which extends between the handle bars, and a brace 30 running diagonally from the cross member 24 to the transmission case.

The attachment is engineered to perform a screening function. A shaker frame carries the screen and is comprised of laterally spaced apart cheek plates 31–32 connected at suitable intervals of the length by cross-members. The screen is in two sections, a rear section 33 constituting the floor of a removable open-front basket 34 and a front section 35 rigid with the shaker frame. Such rear section occupies a generally horizontal plane. The front section is inclined downwardly and forwardly therefrom at a moderate slope and at the front end merges with the after end of a rather steeply inclined grate-like tongue composed of spaced paralleling scoop fingers 38.

The shaker frame is supported at each of its four corners. Front and rear shackle arms 36–37 employed for this purpose provide a parallel suspension, sloping forwardly from lower anchor pivots to upper swing pivots.

The two front shackle arms are each made integral with a transverse rock shaft 40 having trunnion ends which are journaled in said ear prolongations 25 of the attachment's stationary frame. One such front arm is powered, for the shaker action of the shaker screen, off the engine of the tiller by means of an endless V-belt 41 passing a reduction drive from an engine-driven pulley 42 to a driven pulley 43, with the shaft 39 of this latter pulley acting upon the shackle arm by means of a throw-arm 44 reciprocally driven by an eccentric 45. As with the drive to the tiller wheels, the V-belt 41 serves not only for transmission of power but also as a clutch, with the responsible tensioning of the belt being in this instance afforded by shifting the driven pulley 43 in a fore-and-aft direction. To this end a box 46 in which the shaft 43 is journaled is rigidly attached to vertical swing arms 47 having their lower ends connected by a pivot pin 48 to the cross member 24 of the stationary frame. From the box a link 50 extends rearwardly to a lever 51 and is pivoted at 52 to the latter in such offset relation to the fulcrum 53 of the lever as to obtain an over-center travel as the lever is swung from an upright de-clutching position into the lowered clutching position in which it is illustrated in the several views of the drawings.

Welded to each of the two sides of the attachment's stationary frame is a socket-piece 54 for a respective one of two brake teeth 55 replacing the single brake tooth removed from the rear end of the tiller.

As the tiller performs its tilling function material loosened by the tines is propelled rearwardly up the incline of the grate tongue and onto the front section of the screen. This material may be comprised of rocks, dirt lumps which have resisted the reducing action of the tines, coarse grasses such as quack, and roots or the like. The shaker action is such that the screen has a rearward and upward motion and imparts to the matter thereon a bouncing action causing the soil to pass through the screen openings while the matter segregated therefrom works upwardly toward the basket. When the basket becomes full the same may be removed and the rocks and other separated matter which has been caught therein dumped. For conveniently attaching and detaching the basket from the shaker frame springs 56 have been illustrated in FIG. 1.

It is believed that the invention will have been clearly understood from the foregoing description of my now preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In combination with a walking cultivator providing a main frame with an engine mounted thereon and having earthworking wheels journal-mounted from the frame and driven from said engine, a frame removably associated with said main frame and extending rearwardly as a fixed furcate extension thereof, a skeleton frame sustaining a screening floor and occupying the space between the fork arms of said furcate extension and including a respective cheek plate at each of the two sides, a respective shackle arm at each of the four corners of said skeleton frame suspending the cheek plates from the fork arms and supporting the skeleton frame for bodily vertical motion, and a driving connection from the engine to the skeleton frame imparting said vertical motion to the latter so that the skeleton frame acts as a shaker for sifting soil from rocks and other foreign matter loosened by the earthworking wheels.

2. Structure according to claim 1, the drive shaft of said engine extending laterally therefrom, the drives from the engine to the wheels and from the engine to the skeleton frame comprising, in each instance, a respective drive pulley mounted on the drive shaft and connecting by a respective endless belt with a respective driven pulley, each of said drives including a respective clutch.

3. Structure according to claim 2, the drive to the skeleton frame including an eccentric driven by the driven pulley and connecting by a throw arm with at least one of the shackle arms.

4. Structure according to claim 1, the main frame being provided at its rear end with a vertical socket acting in the normal use of the cultivator to support a brake tooth, the skeleton frame having means thereon arranged to fit in said socket and stabilize the skeleton frame when the skeleton frame is attached to the main frame, said skeleton frame providing a socket for a respective brake tooth at each of the two sides thereof.

References Cited in the file of this patent
UNITED STATES PATENTS

| | | |
|---|---|---|
| 834,315 | Moreau | Oct. 30, 1906 |
| 848,089 | Dotson | Mar. 26, 1907 |
| 1,014,394 | Hist | Jan. 9, 1912 |
| 1,241,880 | Pennington | Oct. 2, 1917 |
| 1,647,717 | Perrone | Nov. 1, 1927 |
| 1,713,952 | Darr | May 21, 1929 |
| 2,614,474 | Merry | Oct. 21, 1952 |